US008595430B2

(12) United States Patent
Iwasaki et al.

(10) Patent No.: US 8,595,430 B2
(45) Date of Patent: Nov. 26, 2013

(54) MANAGING A VIRTUAL TAPE LIBRARY DOMAIN AND PROVIDING OWNERSHIP OF SCRATCH ERASED VOLUMES TO VTL NODES

(75) Inventors: Norie Iwasaki, Fujisawa (JP); Katsuyoshi Katori, Kawasaki (JP); Hiroyuki Miyoshi, Kawasaki (JP); Takeshi Nohta, Odawara (JP); Eiji Tosaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 12/894,613

(22) Filed: Sep. 30, 2010

(65) Prior Publication Data
US 2012/0084499 A1  Apr. 5, 2012

(51) Int. Cl.
G06F 12/00 (2006.01)
G06F 13/00 (2006.01)
G06F 13/28 (2006.01)

(52) U.S. Cl.
USPC ............... 711/111; 711/4; 711/100; 711/161; 711/162; 711/165

(58) Field of Classification Search
None
See application file for complete search history.

(56) References Cited

U.S. PATENT DOCUMENTS 6,304,880 B1 * 10/2001 Kishi ..................................... 1/1
7,620,765 B1 * 11/2009 Ohr et al. ............................ 711/4
8,082,388 B2 * 12/2011 Bello et al. ..................... 711/111
8,341,346 B2 * 12/2012 Ashton et al. ................. 711/111
2002/0156968 A1 * 10/2002 Haustein ....................... 711/111

FOREIGN PATENT DOCUMENTS

| JP | 2003-058326 | 2/2003 |
| JP | 200358326 A | 2/2003 |
| JP | 2003-067248 | 3/2003 |
| JP | 200367248 A | 3/2003 |
| JP | 2003-043162 | 2/2009 |
| JP | 200943162 A | 2/2009 |
| WO | 98/40810 | 9/1998 |
| WO | 9840810 A2 | 9/1998 |
| WO | 2004/072961 | 8/2004 |
| WO | 2004042961 A2 | 8/2004 |

OTHER PUBLICATIONS

International Search Report for counterpart application No. PCT/JP2011/004347, dated Oct. 18, 2011.

* cited by examiner

Primary Examiner — Sanjiv Shah
Assistant Examiner — Marwan Ayash
(74) Attorney, Agent, or Firm — Griffiths & Seaton PLLC

(57) ABSTRACT

Systems and methods for managing a virtual tape library (VTL) domain capable of being coupled to a host are provided. One system includes a plurality of VTL nodes configured to store multiple scratch erased volumes. Each VTL node comprises a processor configured to perform at least a portion of the below method. One method includes receiving a request from the host to de-mount a volume in one of the plurality of VTL nodes, transferring the volume to a scratch category in response to receiving the request, erasing data in the volume and categorizing the volume as a scratch erased volume, and providing ownership of the scratch erased volume to a VTL node in the plurality of VTL nodes based on pre-determined criteria for the plurality of VTL nodes. Also provided are computer storage mediums including computer code for performing the above method.

9 Claims, 3 Drawing Sheets

MANAGING A VIRTUAL TAPE LIBRARY DOMAIN AND PROVIDING OWNERSHIP OF SCRATCH ERASED VOLUMES TO VTL NODES

BACKGROUND OF THE INVENTION

1. Field of the Invention

The present invention relates in general to storage systems, and particularly to, systems and methods for managing a virtual tape library domain.

2. Description of the Related Art

A virtual tape library (VTL) typically provides a host with a high-speed tape library by using, for example, disks. In general, the host uses the tape library as follows:

1.) The host inserts a tape volume (hereinafter, referred to as a "volume") into the tape library. The volume is identified by a volume serial number ("VOLSER") and the inserted volume is categorized under a category named "insert" category. A category is one of the volume attributes and is necessarily defined for each volume to represent the state and usage of the volume at a particular time;

2.) The host transfers the volume in the insert category to a "scratch" category. The scratch category is used to store blank and/or reusable tapes;

3.) The host requests the mount of a volume. The tape library mounts the requested volume and provides the host with the volume. The host requests the mount by specifying the VOLSER and requesting the mount of a specific volume (specific mount) or by specifying a category and requesting any volume in the category (category mount). In the case where new data is written starting at the beginning of the volume, generally the scratch category is specified and a category mount operation is performed (hereinafter, referred to as a "scratch mount");

4.) The host transfers the mounted volume into a "private" category and performs an input/output (I/O) operation;

5.) After the completion of the I/O operation, the host requests a "de-mount" of the volume; and 6.) With regard to a volume no longer required among the volumes in the private category, the host transfers the volume to the scratch category. Basically, the data in the volume transferred to the scratch category is no longer guaranteed and may be erased at this point in time such that the volume is reusable. The volume in the scratch category is provided to the host when the host later requests the mount of the volume.

In the case where no volumes are left in the scratch category, the tape library recognizes that there is no available blank or reusable tape. If the host requests a scratch mount in such a situation, the mount request fails.

The VTL performs the above functions utilizing storage disks. There are many advantages to utilizing storage disks compared to a physical tape library, particularly, in that the VTL is able to respond to a scratch mount request at high speed. The VTL is able to quickly respond to the host because a logical volume is prepared on the disks, instead of actually mounting a physical tape.

Moreover, the VTL does not typically immediately erase the data in the volume once the volume is transferred to the scratch category so that a user is able to restore the data of a volume that the user mistakenly transferred to the scratch category. Instead, the data is left in tact for a predetermined amount of time (e.g., 24 hours) before the data is erased. In this regard, a volume which is in the scratch category and whose data is not erased yet is referred to as a "scratch unerased" volume and a volume whose data was completely erased after a lapse of the predetermined amount of time is referred to as a "scratch erased" volume.

In addition, many VTLs support clustering of multiple VTLs. An object of clustering VTLs is to increase the number of virtual tape drives and the disk capacity, and to implement higher availability and disaster recovery solutions by data replication. In general, VTLs are connected to each other via an Internet Protocol (IP) network or the like, and appear as a single virtual tape library to the host. Here, the entire clustering configuration is referred to as a "VTL domain" and each of the VTLs constituting the VTL domain is referred to as a "VTL node."

When the host performs an insertion or mounting operation in the clustering configuration, a request command from the host is received by a VTL node to which the host is physically connected. Thereafter, the VTL nodes communicate with each other to have consistency within the VTL domain and to return a reply to the host.

In the VTL clustering configuration, it is also possible for two VTL nodes to be connected to one host, and the host operates such that the host individually issues mount requests to each of the VTL nodes. In such a case, a scratch category common to the two VTL nodes is generally used.

During operation, conventional VTL nodes are expected to comply with a mount request from the host by operating as follows:

1.) The VTL nodes communicate with each other to check how many volumes in the scratch category (e.g., scratch unerased volumes and scratch erased volumes) exist in the VTL domain; and 2.) The VTL node selects a volume, which is erased at the earliest possible time, among the scratch erased volumes and provides the volume to the host. If there are no scratch erased volumes in the entire VTL domain, the VTL node selects a volume, which is transferred to the scratch category at the earliest possible time, among the scratch unerased volumes and provide the volume to the host.

If these operations are performed every time the host requests the mount, the VTL nodes will need to communicate with each other to select a scratch volume each time the host requests the mount, which sacrifices mount performance, which is a primary goal of VTL nodes. One conventional technique to overcome the need for the VTL nodes to communicate with each other every time the host requests a mount provides a method that determines ahead of time which volumes are going to be managed by which VTL node. That is, for each volume, a VTL node is designated as the "owner" of the volume, which ownership is transferrable between VTL nodes. The volume owner VTL node has the exclusive access to the user data and the metadata of the volume. When a VTL node needs to mount a volume and the node is not the current owner of the volume, the VTL node first acquires ownership of the volume in the VTL domain and becomes the new owner of the volume.

All of the volumes, including the volumes transferred to the scratch category, have their owner node defined at all the times. Specifically, when the host issues a scratch mount request to a VTL node, the VTL node selects the earliest volume from the volumes that are in the scratch category and whose owner is the VTL node, and provides the earliest volume to the host. In this regard, even if there is no scratch erased volume and the earliest volume is a scratch unerased volume, the VTL node erases data in the scratch unerased volume at that time and then provides the volume to the host. Only in the case where the VTL node has no volume that is in the scratch category and whose owner is the VTL node does the VTL node communicate with other VTL nodes in the VTL domain. Here, the VTL node selects the earliest volume in the VTL domain, transfers the ownership of the earliest volume to itself, and then provides the earliest volume to the host.

While this method optimizes the scratch mount performance by minimizing the communication between VTL nodes, the elimination of communication between VTL nodes may cause other inefficiencies. The following describes at least some of the inefficiencies experienced when multiple VTL nodes do not communicate with one another:

1.) In a clustering configuration, which is composed of two or more nodes (e.g., a VTL node 0 and VTL node 1), there is a possibility that there may be a significant difference between the number of scratch volumes for which VTL node 0 has the ownership of and the number of scratch volumes for which the VTL node 1 has the ownership of. For example, VTL node 0 may own many scratch volumes and VTL node 1 may own only a few scratch volumes;

2.) In this situation, the rate at which the host transfers a volume to the scratch category may be about the same as the rate at which the host issues a scratch mount request to the VTL nodes;

3.) In this case, there should be enough scratch unerased volumes and scratch erased volumes whose owner is VTL node 0. Here, upon receiving a mount request from the host, the VTL node 0 returns the earliest volume among the scratch erased volumes whose owner is the VTL node 0 to the host. On the other hand, however, there are not many scratch volumes whose owner is the VTL node 1 and it is possible that no scratch erased volumes whose owner is the VTL node 1 exist yet. Therefore, upon receiving a scratch mount request from the host to VTL node 1, VTL node 1 will need to erase a scratch unerased volume whose owner is VTL node 1 at that moment and provide the erased volume to the host, even though there still remains a scratch erased volume whose owner is VTL node 0; and 4.) In this situation, a volume whose owner is VTL node 1 may possibly be prematurely erased immediately after the host transfers the volume to the scratch category. In the case where the user transfers the volume to the scratch category by an operating error, the data will be completely lost and cannot be restored.

SUMMARY OF THE INVENTION

Various embodiments provide systems for managing a virtual tape library (VTL) domain capable of being coupled to a host. One system comprises a plurality of VTL nodes configured to store a plurality of scratch erased volumes and capable of being coupled to the host. Each VTL node comprises a processor configured to be coupled to the host. In one embodiment, each processor is configured to receive a request from the host to de-mount a volume in one of the plurality of VTL nodes and transfer the volume to a scratch category in response to receiving the request. Each processor is further configured to erase data stored in the volume and categorize the volume as a scratch erased volume and provide ownership of the scratch erased volume to a VTL node in the plurality of VTL nodes based on pre-determined criteria for the plurality of VTL nodes.

Various other embodiments provide methods for managing a virtual tape library (VTL) domain coupled to a host, the VTL domain comprising a plurality of VTL nodes, each VTL node comprising a processor and configured to store a plurality of scratch erased volumes. One method comprises receiving a request from the host to de-mount a volume in one of the plurality of VTL nodes and transferring the volume to a scratch category in response to receiving the request. The method further comprises erasing data stored in the volume and categorizing the volume as a scratch erased volume and providing ownership of the scratch erased volume to a VTL node in the plurality of VTL nodes based on pre-determined criteria for the plurality of VTL nodes.

Also provided are physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for managing a virtual tape library (VTL) domain coupled to a host, the VTL domain comprising a plurality of VTL nodes, each VTL node comprising a processor and configured to store a plurality of scratch erased volumes. One physical computer storage medium comprises computer code for receiving a request from the host to de-mount a volume in one of the plurality of VTL nodes and computer code for transferring the volume to a scratch category in response to receiving the request. The physical computer storage medium further comprises computer code for erasing data stored in the volume and categorizing the volume as a scratch erased volume and computer code for providing ownership of the scratch erased volume to a VTL node in the plurality of VTL nodes based on pre-determined criteria for the plurality of VTL nodes.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Various embodiments provide systems and methods for managing a virtual tape library (VTL) domain. Also provided are computer storage mediums including computer code for managing a VTL domain.

Figure 1:
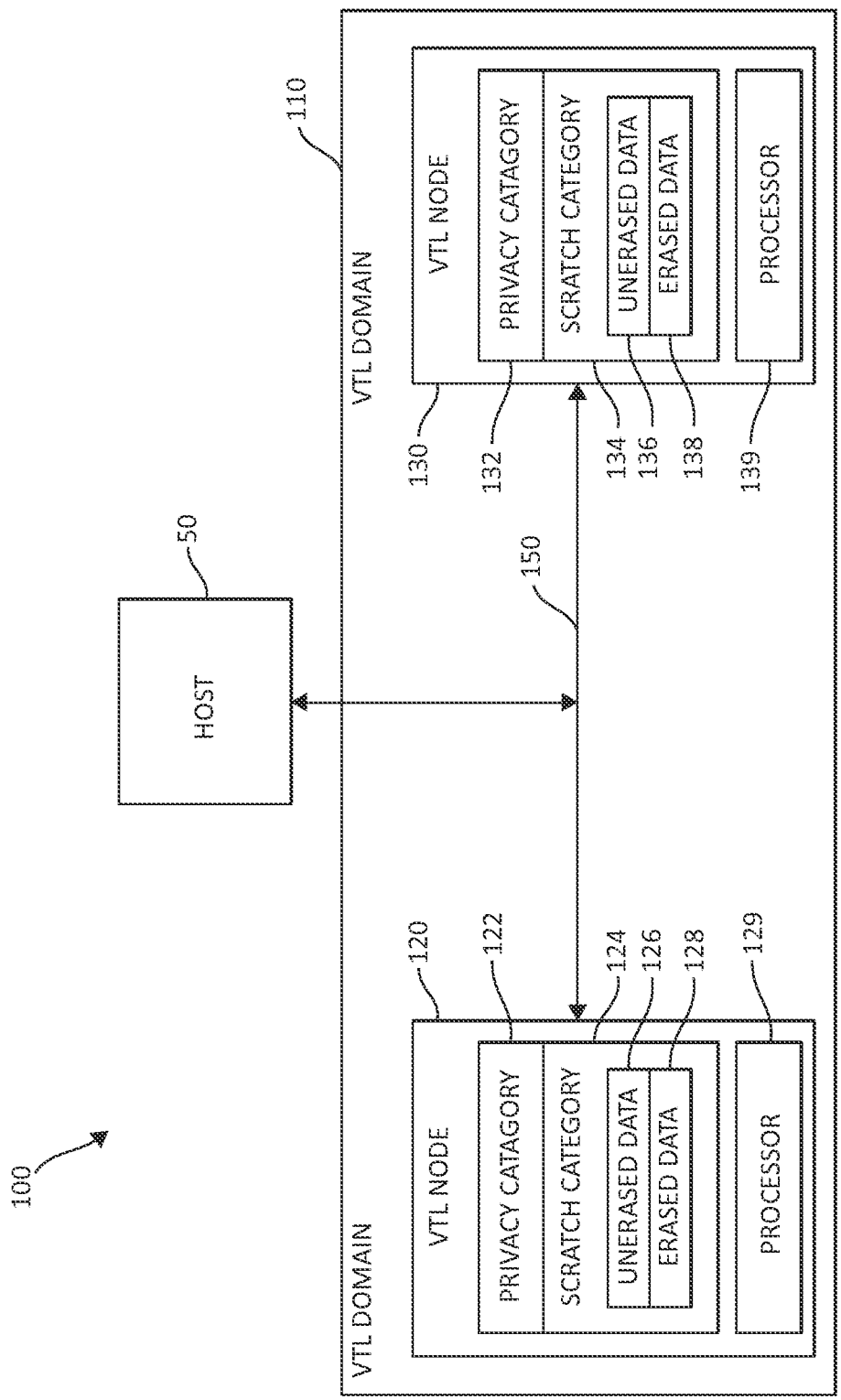
FIG. 1 is a block diagram of one embodiment of a system for managing a virtual tape library (VTL) domain.

Turning now to the figures, FIG. 1 is a block diagram of one embodiment of a system 100 for managing a VTL domain 110 capable of being coupled to a host computing device 50. At least in the illustrated embodiment, VTL domain 110 comprises a VTL node 120 and a VTL node 130 arranged in a cluster configuration via a bus 150 (e.g., a wired and/or wireless bus).

VTL node 120 is configured to store or "own" a plurality of tape volumes (hereinafter, referred to as a "volumes") and comprises a processor 129 to manage the volumes. The volumes owned by VTL node 120 are configured to store data such that host 50 is capable of performing input/output (I/O) operations within system 100. Furthermore, each volume is configured to include a category depending on the status of the volume at any given particular time.

When host 50 is utilizing a volume, the volume is transferred to a private category 122 in VTL node 120. When host 50 is not utilizing the volume, the volume is transferred to a scratch category 124. Within scratch category 124, there are two sub-categories, namely, a scratch unerased sub-category 126 and a scratch erased sub-category 128.

A volume within scratch category 124 includes scratch unerased sub-category 126 after the volume has been de-mounted by host 50, but the data stored in the volume has not been erased. In various embodiments, a volume may remain in scratch unerased sub-category 126 for any predetermined amount of time after the volume has been de-mounted by host 50. In one embodiment, a volume remains in scratch unerased sub-category 126 for about twenty-four hours after the volume has been de-mounted by host 50. In other embodiments, a volume may remains in scratch unerased sub-category 126 for greater than or less than twenty-four hours after the volume has been de-mounted by host 50. In this manner, the data in the volume may be recovered in the event that a user or host 50 desires to utilize the data within the predetermined period of time in which the volume resides in scratch unerased sub-category 126. After the volume has resided in scratch unerased sub-category 126 for the predetermined period of time, the data in the volume is erased and the volume transferred to scratch erased sub-category 128.

Volumes residing in scratch erased sub-category 128 are available for mounting by host 50. That is, VTL node 120 is configured to mount a volume residing in scratch erased sub-category 128 in response to receiving a request from host 50 to utilize the volume for an I/O operation. Furthermore, VTL node 120 is configured to transfer the volume from scratch category 122, and specifically scratch erased sub-category 128, to private category 122 in response to mounting the volume.

Processor 129 is configured to manage the ownership of the various volumes within VTL node 120 and VTL domain 110. That is, processor 129 is configured to at least partially determine the ownership of the volumes between VTL node 120 and VTL node 130.

In one embodiment, processor 129 is configured to determine the ownership of various volumes within VTL domain 110 based on a global predetermined threshold amount of scratch erased volumes for each VTL node (e.g., VTL nodes 120, 130) or a predetermined threshold amount of scratch erased volumes for each respective VTL node (e.g., VTL nodes 120, 130). In this embodiment, processor 129 is configured to monitor the number of volumes in each of scratch erased sub-category 128 and scratch erased sub-category 138.

Furthermore, processor 129 is configured to receive a request from host 50 to de-mount a volume residing in private category 122. In response thereto, processor 129 is configured to transfer the volume from private category 122 to scratch unerased sub-category 126. Processor 129 is further configured to erase the data in the volume after the volume has resided in unerased sub-category 126 for the predetermined amount of time. After the data has been erased, processor 129 is configured to compare the number of volumes in scratch erased sub-category 128 to the global predetermined threshold number of scratch erased volumes and compare the number of volumes in scratch erased sub-category 138 to the global predetermined threshold number of scratch erased volumes or to the predetermined threshold number of scratch erased volumes for each respective VTL node.

If scratch erased sub-category 128 or scratch erased sub-category 138 includes less than the predetermined amount of scratch erased volumes for a respective VTL node (i.e., the global predetermined threshold amount or the individual predetermined threshold amount), processor 129 is configured to provide ownership of the volume and transfer the volume to that scratch erased sub-category (i.e., scratch erased sub-category 128 or scratch erased sub-category 138). If scratch erased sub-category 128 and scratch erased sub-category 138 both include less than their respective predetermined amount of scratch erased volumes, processor 129 is configured determine which of scratch erased sub-category 128 and scratch erased sub-category 138 includes the fewest relative number of volumes and provide ownership of the volume to and transfer the volume to that scratch erased sub-category (i.e., scratch erased sub-category 128 or scratch erased sub-category 138). If scratch erased sub-category 128 and scratch erased sub-category 138 both include a greater number of volumes than their respective predetermined amount of scratch erased volumes, processor 129 is configured determine which of scratch erased sub-category 128 and scratch erased sub-category 138 includes the fewest relative number of volumes and provide ownership of the volume to and transfer the volume to that scratch erased sub-category (i.e., scratch erased sub-category 128 or scratch erased sub-category 138).

In another embodiment, processor 129 is configured to determine the ownership of various volumes within VTL domain 110 based on the relative traffic with which VTL nodes 120, 130 operate and the number of volumes within scratch erased sub-category 128 and scratch erased sub-category 138. In this embodiment, processor 129 is configured to generate a ratio of the number volumes in each scratch erased sub-category (i.e., scratch erased sub-category 128 or scratch erased sub-category 138) and the frequency with which host 50 utilizes VTL nodes 120, 130 for performing I/O operations (i.e., the frequency in which host 50 utilizes volumes from VTL nodes 120, 130) and provides ownership of scratch erased volumes based on the ratio.

In this embodiment, processor 129 is configured to receive a request from host 50 to de-mount a volume residing in private category 122. In response thereto, processor 129 is configured to transfer the volume from private category 122 to scratch unerased sub-category 126. Processor 129 is further configured to erase the data in the volume after the volume has resided in scratch unerased sub-category 126 for the predetermined amount of time. After the data has been erased, processor 129 is configured to generate a ratio of the number volumes in scratch erased sub-category 128 and the frequency with which host 50 utilizes VTL node 120 for performing I/O operations (i.e., the frequency in which host 50 utilizes volumes from VTL node 120). Furthermore, processor 129 is configured to generate a ratio of the number volumes in scratch erased sub-category 138 and the frequency with which host 50 utilizes VTL node 130 for performing I/O operations (i.e., the frequency in which host 50 utilizes volumes from VTL node 130).

Processor 129 is configured to then compare the ratios and provide ownership of the volume and transfer the volume to the scratch erased sub-category (i.e., scratch erased sub-category 128 or scratch erased sub-category 138) with the lowest ratio. If the ratios are within a predetermined threshold amount, processor 129 is configured to provide ownership of the volume and transfer the volume to the scratch erased sub-category (i.e., scratch erased sub-category 128 or scratch erased sub-category 138) associated with the VTL node (i.e., VTL node 120 or VTL node 130) that is utilized by host 50 with the greatest frequency.

VTL node 130 is also configured to store or own a plurality of volumes and comprises a processor 139. The volumes owned by VTL node 130 are configured to store data such that host 50 is capable of performing input/output (I/O) operations within system 100. Furthermore, each volume is configured to include a category depending on the status of the volume at any given particular time.

When host 50 is utilizing a volume, the volume is transferred to a private category 132 in VTL node 130. When host 50 is not utilizing the volume, the volume is transferred to a scratch category 134. Within scratch category 134, there are two sub-categories, namely, a scratch unerased sub-category 136 and a scratch erased sub-category 138.

A volume within scratch category 134 includes scratch unerased sub-category 136 after the volume has been de-mounted by host 50, but the data stored in the volume has not been erased. In various embodiments, a volume may remain in scratch unerased sub-category 136 for any predetermined amount of time after the volume has been de-mounted by host 50. In one embodiment, a volume remains in scratch unerased sub-category 136 for about twenty-four hours after the volume has been de-mounted by host 50. In other embodiments, a volume may remains in scratch unerased sub-category 136 for greater than or less than twenty-four hours after the volume has been de-mounted by host 50. In this manner, the data in the volume may be recovered in the event that a user or host 50 desires to utilize the data within the predetermined period of time in which the volume resides in scratch unerased sub-category 136. After the volume has resided in scratch unerased sub-category 136 for the predetermined period of time, the data in the volume is erased and the volume transferred to scratch erased sub-category 138.

Volumes residing in scratch erased sub-category 138 are available for mounting by host 50. That is, VTL node 130 is configured to mount a volume residing in scratch erased sub-category 138 in response to receiving a request from host 50 to utilize the volume for an I/O operation. Furthermore, VTL node 130 is configured to transfer the volume from scratch category 132, and specifically scratch erased sub-category 138, to private category 132 in response to mounting the volume.

Processor 139 is configured to manage the ownership of various volumes within VTL node 130 and VTL domain 110. That is, processor 139 is configured to at least partially determine the ownership of the volumes between VTL node 120 and VTL node 130.

In one embodiment, processor 139 is configured to determine the ownership of various volumes within VTL domain 110 based on a global predetermined threshold amount of scratch erased volumes for each VTL node (e.g., VTL nodes 120, 130) or a predetermined threshold amount of scratch erased volumes for each respective VTL node (e.g., VTL nodes 120, 130). In this embodiment, processor 139 is configured to monitor the number of volumes in each of scratch erased sub-category 128 and scratch erased sub-category 138.

Furthermore, processor 139 is configured to receive a request from host 50 to de-mount a volume residing in private category 132. In response thereto, processor 139 is configured to transfer the volume from private category 132 to scratch unerased sub-category 136. Processor 139 is further configured to erase the data in the volume after the volume has resided in unerased sub-category 136 for the predetermined amount of time. After the data has been erased, processor 139 is configured to compare the number of volumes in scratch erased sub-category 138 to the global predetermined threshold number of scratch erased volumes and compare the number of volumes in scratch erased sub-category 128 to the global predetermined threshold number of scratch erased volumes or to the predetermined threshold number of scratch erased volumes for each respective VTL node.

If scratch erased sub-category 128 or scratch erased sub-category 138 includes less than the predetermined amount of scratch erased volumes for a respective VTL node (i.e., the global predetermined threshold amount or the individual predetermined threshold amount), processor 139 is configured to provide ownership of the volume and transfer the volume to that scratch erased sub-category (i.e., scratch erased sub-category 128 or scratch erased sub-category 138). If scratch erased sub-category 128 and scratch erased sub-category 138 both include less than their respective predetermined amount of scratch erased volumes, processor 139 is configured determine which of scratch erased sub-category 128 and scratch erased sub-category 138 includes the fewest relative number of volumes and provide ownership of the volume to and transfer the volume to that scratch erased sub-category (i.e., scratch erased sub-category 128 or scratch erased sub-category 138). If scratch erased sub-category 128 and scratch erased sub-category 138 both include a greater number of volumes than their respective predetermined amount of scratch erased volumes, processor 139 is configured determine which of scratch erased sub-category 128 and scratch erased sub-category 138 includes the fewest relative number of volumes and provide ownership of the volume to and transfer the volume to that scratch erased sub-category (i.e., scratch erased sub-category 128 or scratch erased sub-category 138).

In another embodiment, processor 139 is configured to determine the ownership of various volumes within VTL domain 110 based on the relative traffic with which VTL nodes 120, 130 operate and the number of volumes within scratch erased sub-category 128 and scratch erased sub-category 138. In this embodiment, processor 139 is configured to generate a ratio of the number volumes in each scratch erased sub-category (i.e., scratch erased sub-category 128 or scratch erased sub-category 138) and the frequency with which host 50 utilizes VTL nodes 120, 130 for performing I/O operations (i.e., the frequency in which host 50 utilizes volumes from VTL nodes 120, 130) and provides ownership of scratch erased volumes based on the ratio.

In this embodiment, processor 139 is configured to receive a request from host 50 to de-mount a volume residing in private category 132. In response thereto, processor 139 is configured to transfer the volume from private category 122 to scratch unerased sub-category 136. Processor 139 is further configured to erase the data in the volume after the volume has resided in scratch unerased sub-category 136 for the predetermined amount of time. After the data has been erased, processor 139 is configured to generate a ratio of the number volumes in scratch erased sub-category 128 and the frequency with which host 50 utilizes VTL node 120 for performing I/O operations (i.e., the frequency in which host 50 utilizes volumes from VTL node 120). Furthermore, processor 139 is configured to generate a ratio of the number volumes in scratch erased sub-category 138 and the frequency with which host 50 utilizes VTL node 130 for performing I/O operations (i.e., the frequency in which host 50 utilizes volumes from VTL node 130).

Processor 139 is configured to then compare the ratios and provide ownership of the volume and transfer the volume to the scratch erased sub-category (i.e., scratch erased sub-category 128 or scratch erased sub-category 138) with the lowest ratio. If the ratios are within a predetermined threshold amount, processor 139 is configured to provide ownership of the volume and transfer the volume to the scratch erased sub-category (i.e., scratch erased sub-category 128 or scratch erased sub-category 138) associated with the VTL node (i.e., VTL node 120 or VTL node 130) that is utilized by host 50 with the greatest frequency.

Although VTL domain 110 is illustrated and described as comprising VTL node 120 and VTL node 130, VTL domain may include additional VTL nodes. In other words, VTL domain 110 may include more than two VTL nodes depending on the desired configuration of system 100 and/or VTL domain 110.

Figure 2:
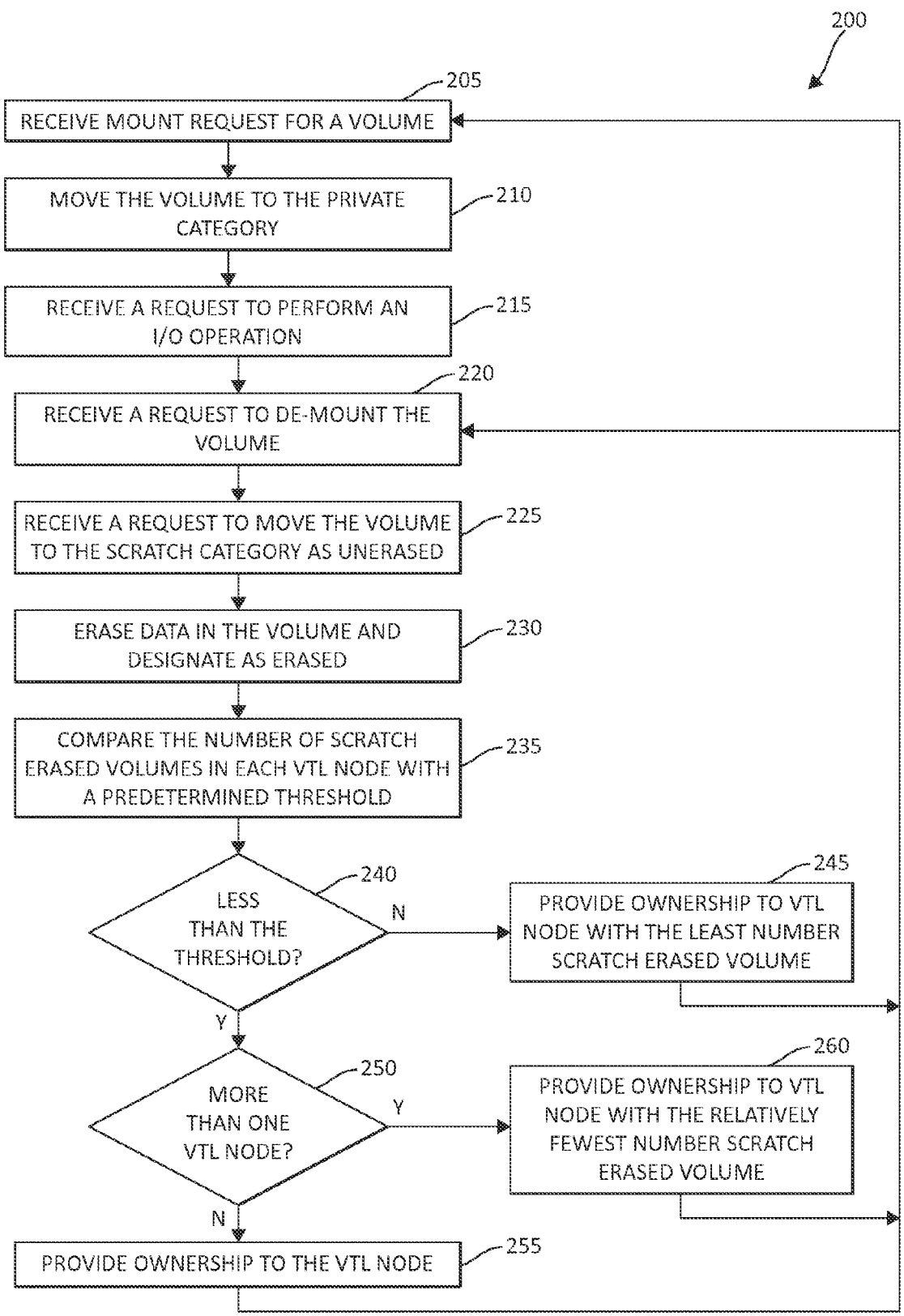
FIG. 2 is a flow diagram of one embodiment of a method for managing scratch erased volumes in a VTL domain.

Turning now to FIG. 2, FIG. 2 is a flow diagram of one embodiment of a method 200 for managing scratch erased volumes in a VTL domain (e.g., VTL domain 110) comprising a plurality of VTL nodes (e.g., VTL nodes 120, 130). At least in the illustrated embodiment, method 200 begins by receiving a mount request to utilize a volume (block 205).

Method 200 further comprises transferring the volume to a private category within a VTL node (block 210) and receiving, from a host (e.g., host 50), a request to perform an I/O operation utilizing the volume (block 215). A request to de-mount the volume is received (block 220) and a request to transfer the volume to a scratch unerased sub-category within the scratch category of the VTL node is also received (block 225).

The data within the volume is erased and the volume is designated as a scratch erased volume sub-after the volume has resided within the scratch unerased sub-category for a predetermined amount of time (block 230). In one embodiment, the volume remains in scratch unerased sub-category for about twenty-four hours prior to erasing the data. In other embodiments, the volume may remain in the scratch unerased sub-category for greater than or less than twenty-four hours prior to erasing the data.

After the volume is designated as a scratch erased volume, method 200 comprises comparing the number of scratch erased volumes in each VTL node with a predetermined threshold amount of scratch erased volumes for the VTL nodes (block 235). In one embodiment, each VTL node includes the same predetermined threshold amount of scratch erased volumes. In another embodiment, at least two VTL nodes include different predetermined threshold amounts of scratch erased volumes.

If there are no VTL nodes that include less than their respective predetermined threshold amount of scratch erased volumes, ownership of the volume is provided to a VTL node or the VTL node with the least number of scratch erased volumes (block 245). If there is at least one VTL node that includes less than its respective predetermined threshold amount of scratch erased volumes, method 200 then determines if there are more than one VTL include less than threshold number of scratch erased volumes (block 250).

If there is only one VTL node that includes less than its respective predetermined threshold amount of scratch erased volumes, ownership of the volume is provided to that VTL node (block 255). If there are multiple VTL nodes that include less than their respective predetermined threshold amount of scratch erased volumes, ownership of the volume is provided to a VTL node or the VTL node with the fewest number of scratch erased volumes relative to its respective predetermined threshold amount of scratch erased volumes (block 260). After ownership of the volume has been provided to a VTL node at block 245, 255, or 260, method 200 includes receiving a mount request for another volume (block 205) or includes receiving a request to de-mount another volume that has been utilized in an I/O operation (block 220).

Figure 3:
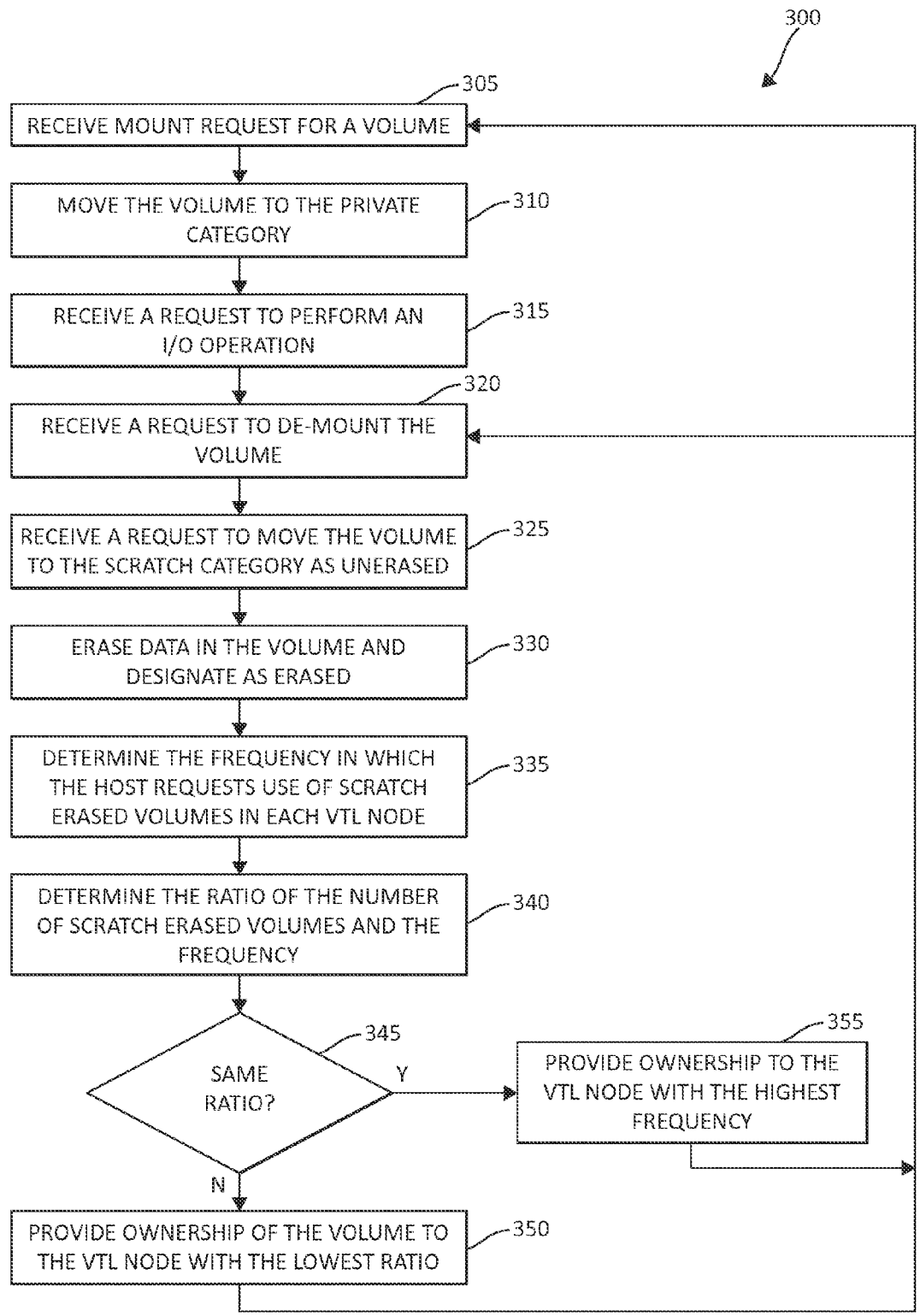
FIG. 3 is a flow diagram of another embodiment of a method for managing scratch erased volumes in a VTL domain.

Turning now to FIG. 3, FIG. 3 is a flow diagram of another embodiment of a method 300 for managing scratch erased volumes in a VTL domain (e.g., VTL domain 110) comprising a plurality of VTL nodes (e.g., VTL nodes 120, 130). At least in the illustrated embodiment, method 300 begins by receiving a mount request to utilize a volume (block 305).

Method 300 further comprises transferring the volume to a private category within a VTL node (block 310) and receiving, from a host (e.g., host 50), a request to perform an I/O operation utilizing the volume (block 315). A request to de-mount the volume is received (block 320) and a request to transfer the volume to a scratch unerased sub-category within the scratch category of the VTL node is also received (block 325).

The data within the volume is erased and the volume is designated as a scratch erased volume sub-after the volume has resided within the scratch unerased sub-category for a predetermined amount of time (block 330). In one embodiment, the volume remains in scratch unerased sub-category for about twenty-four hours prior to erasing the data. In other embodiments, the volume may remain in the scratch unerased sub-category for greater than or less than twenty-four hours prior to erasing the data.

After the volume is designated as a scratch erased volume, method 300 comprises determining the frequency in which a host (e.g., host 50) requests use of volumes within each of the plurality of VTL nodes (block 335). Method 300 then compares the number of scratch erased volumes in each VTL node and the respective determined volume use frequency to determine a ratio of scratch erased volumes to volume use frequency for each VTL node (block 340).

Method 300 further comprises determining if two or more VTL nodes include the same lowest ratio or the lowest ratios that are within a predetermined amount of one another (block 345). If two or more VTL nodes do not include the same lowest ratio or the lowest ratios that are within a predetermined amount of one another, ownership of the volume is provided to the VTL node with the lowest ratio (block 350). If two or more VTL nodes include the same lowest ratio or the lowest ratios that are within a predetermined amount of one another, ownership of the volume is provided to the VTL node with the highest frequency of use by the host (block 355). After ownership of the volume has been provided to a VTL node at block 350 or 355, method 300 includes receiving a mount request for another volume (block 305) or includes receiving a request to de-mount another volume that has been utilized in an I/O operation (block 320).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electro-magnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A system for managing a virtual tape library (VTL) domain capable of being coupled to a host, comprising:
   a plurality of VTL nodes configured to store a plurality of scratch erased volumes and capable of being coupled to the host, wherein each VTL node comprises:
   a processor configured to be coupled to the host, wherein each processor is configured to:
   receive a request from the host to de-mount a volume in one of the plurality of VTL nodes;
   transfer the volume to a scratch category in response to receiving the request;
   erase data stored in the volume and categorize the volume as a scratch erased volume;
   compare a number of scratch erased volumes owned by each VTL node with a predetermined threshold number of scratch erased volumes;
   determine a frequency at which the host requests use of scratch erased volumes in each of the plurality of VTL nodes;
   determine a ratio of a number of scratch erased volumes owned by each VTL node with respect to the frequency; and
   provide ownership of the scratch erased volume to a VTL node which owns a least amount of scratch erased volumes relative to other VTL nodes in the plurality of VTL nodes based on the comparison or the ratio.

2. The system of claim 1, wherein the VTL node owns less than the predetermined threshold number of scratch erased volumes.

3. The system of claim 1, wherein the VTL node owns a least amount of scratch erased volumes with respect to the ratio.

4. A method for managing a virtual tape library (VTL) domain coupled to a host, the VTL domain comprising a plurality of VTL nodes, each VTL node comprising a processor and configured to store a plurality of scratch erased volumes, the method comprising:

receiving, by a first processor, a request from the host to de-mount a volume in one of the plurality of VTL nodes;

transferring the volume to a scratch category in response to receiving the request;

erasing data stored in the volume and categorizing the volume as a scratch erased volume;

comparing, by each respective processor, a number of scratch erased volumes owned by each VTL node with a predetermined threshold number of scratch erased volumes so that each respective processor makes a comparison;

determining, by each respective processor, a frequency at which the host requests use of scratch erased volumes in its VTL node;

determining, by each respective processor, a ratio of a number of scratch erased volumes owned by its VTL node with respect to the frequency;

providing ownership of the scratch erased volume to a VTL node which owns a least amount of scratch erased volumes relative to other VTL nodes in the plurality of VTL nodes based on the comparisons or the ratio.

5. The method of claim 4, wherein the VTL node owns less than the predetermined threshold number of scratch erased volumes.

6. The method of claim 4, wherein the VTL node owns a least amount of scratch erased volumes with respect to the ratio.

7. A non-transitory computer storage medium storing computer code which when executed by a processor, executes a computer program product method for managing a virtual tape library (VTL) domain coupled to a host, the VTL domain comprising a plurality of VTL nodes, each VTL node comprising a processor and configured to store a plurality of scratch erased volumes, the non-transitory computer storage medium, comprising:

computer code for receiving a request from the host to de-mount a volume in one of the plurality of VTL nodes;

computer code for transferring the volume to a scratch category in response to receiving the request;

computer code for erasing data stored in the volume and categorizing the volume as a scratch erased volume;

computer code for comparing a number of scratch erased volumes owned by each VTL node with a predetermined threshold number of scratch erased volumes;

computer code for determining a frequency at which the host requests use of scratch erased volumes in each of the plurality of VTL nodes;

computer code for determining a ratio of a number of scratch erased volumes owned by each VTL node with respect to the frequency;

computer code for providing ownership of the scratch erased volume to a VTL node which owns a least amount of scratch erased volumes relative to other VTL nodes in the plurality of VTL nodes based on the comparison or the ratio.

8. The non-transitory computer storage medium of claim 7, wherein the VTL node owns less than the predetermined threshold number of scratch erased volumes.

9. The non-transitory computer storage medium of claim 7, wherein the VTL node owns a least amount of scratch erased volumes with respect to the ratio.

* * * * *